(12) United States Patent
Imazeki et al.

(10) Patent No.: US 11,740,516 B2
(45) Date of Patent: Aug. 29, 2023

(54) DISPLAY DEVICE

(71) Applicant: Japan Display Inc., Tokyo (JP)

(72) Inventors: Yoshikatsu Imazeki, Tokyo (JP); Yoichi Kamijo, Tokyo (JP); Yoshihiro Watanabe, Tokyo (JP); Koichi Miyasaka, Tokyo (JP); Shuichi Osawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/730,840

(22) Filed: Apr. 27, 2022

(65) Prior Publication Data

US 2022/0252925 A1 Aug. 11, 2022

Related U.S. Application Data

(63) Continuation of application No. 17/232,922, filed on Apr. 16, 2021, now Pat. No. 11,320,683, which is a
(Continued)

(30) Foreign Application Priority Data

Oct. 18, 2018 (JP) .................. 2018-196659

(51) Int. Cl.
*G02F 1/1345* (2006.01)
*G02F 1/1335* (2006.01)
*G02F 1/1333* (2006.01)

(52) U.S. Cl.
CPC ...... *G02F 1/1345* (2013.01); *G02F 1/133334* (2021.01); *G02F 1/133512* (2013.01);
(Continued)

(58) Field of Classification Search
None
See application file for complete search history.

(56) References Cited

U.S. PATENT DOCUMENTS

| 2009/0109369 A1 | 4/2009 | Morishita |
| 2011/0051070 A1 | 3/2011 | Sasaki et al. |

(Continued)

FOREIGN PATENT DOCUMENTS

| CN | 105892177 A | * | 8/2016 | ....... G02F 1/133528 |
| CN | 105892177 A | | 8/2016 | |

(Continued)

OTHER PUBLICATIONS

International Search Report dated Oct. 15, 2019 in Application No. PCT/JP2019/033385.

*Primary Examiner* — Shan Liu
(74) *Attorney, Agent, or Firm* — K&L Gates LLP

(57) ABSTRACT

Display device is provided and includes first substrate; second substrate including transparent conductive film; optical element adhered to transparent conductive film; and connecting member, wherein first substrate includes first region which overlaps second substrate and includes display portion, and second region including electrode, second substrate includes substrate edge located at boundary between first and second regions and the second region in first direction, optical element includes optical element edge located between display portion and substrate edge in second direction intersecting first direction, optical element edge does not overlap substrate edge in plan view, transparent conductive film includes extended portion extending from optical element edge toward substrate edge, connecting member is in contact with substrate edge and electrically connects electrode and extended portion, optical element includes notch, and notch and connecting member are arranged in second direction.

3 Claims, 12 Drawing Sheets

Related U.S. Application Data continuation of application No. PCT/JP2019/033385, filed on Aug. 26, 2019.

(52) U.S. Cl.
CPC .. *G02F 1/133528* (2013.01); *G02F 1/133531* (2021.01); *G02F 2201/54* (2013.01)

(56) References Cited

U.S. PATENT DOCUMENTS

| | | | |
|---|---|---|---|
| 2012/0257151 A1* | 10/2012 | Teramoto | G02F 1/13458 349/106 |
| 2013/0050626 A1 | 2/2013 | Miyanaga | |
| 2013/0088672 A1 | 4/2013 | Shin et al. | |
| 2016/0004122 A1 | 1/2016 | Ono | |
| 2017/0343848 A1 | 11/2017 | Abe et al. | |

FOREIGN PATENT DOCUMENTS

| | | | |
|---|---|---|---|
| CN | 207937736 U | * | 10/2018 |
| JP | 2006267369 A | | 10/2006 |
| JP | 2007025643 A | | 2/2007 |
| JP | 2009109562 A | | 5/2009 |
| JP | 2010117458 A | | 5/2010 |
| JP | 2010181747 A | | 8/2010 |
| JP | 2011047975 A | | 3/2011 |
| JP | 2011170200 A | | 9/2011 |
| JP | 2012093468 A | | 5/2012 |
| JP | 2012220677 A | | 11/2012 |
| KR | 10-20120118205 A | | 10/2012 |

* cited by examiner

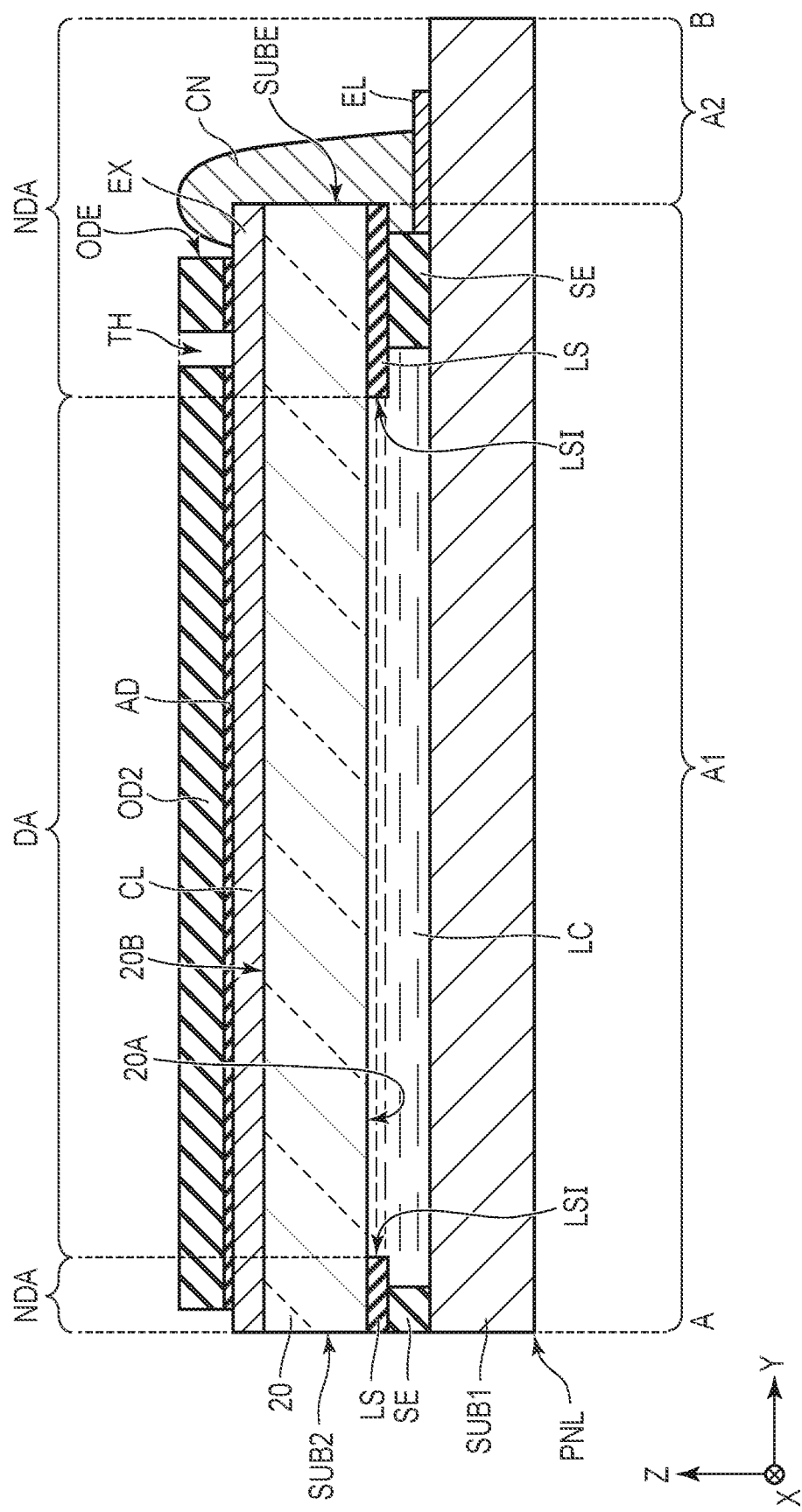
F I G. 4

DISPLAY DEVICE

CROSS-REFERENCE TO RELATED APPLICATION

This application is a continuation application of U.S. patent application Ser. No. 17/232,922, filed on Apr. 16, 2021, which application is a continuation application of PCT Application No. PCT/JP2019/033385, filed Aug. 26, 2019 and based upon and claiming the benefit of priority from Japanese Patent Application No. 2018-196659, filed Oct. 18, 2018, the entire contents of all of which are incorporated herein by reference.

FIELD

Embodiments described herein relate generally to a display device.

BACKGROUND

In recent years, a technique has been known in which in a lateral electric field type liquid crystal display device, a transparent conductive film provided on the surface of one substrate and an electrode or a circuit board having a ground potential provided on the other substrate are electrically connected by a connecting member as a countermeasure against static electricity. A polarizer is provided on the transparent conductive film. When the polarizer expands, the polarizer and the connecting member come into contact with each other, which may reduce the area of contact between the connecting member and the transparent conductive film. In particular, with the demand for a narrower frame, the polarizer and the connecting member tend to be disposed close to each other, which is easily affected by even a slight expansion of the polarizer.

SUMMARY

The present disclosure generally relates to a display device.

According to an embodiment, a display device includes a first substrate including an electrode, a second substrate including a substrate edge, a transparent conductive film including an extended portion, an optical element adhered to the transparent conductive film, and a connecting member. The connecting member is in contact with the substrate edge and electrically connects the electrode and the extended portion. The optical element includes a penetration portion. The penetration portion and the connecting member are arranged in a direction intersecting an extending direction of the substrate edge.

BRIEF DESCRIPTION OF THE DRAWINGS

FIG. 4 is a cross-sectional view of a display panel PNL along A-B shown in FIG. 1.

DETAILED DESCRIPTION

Figure 1:
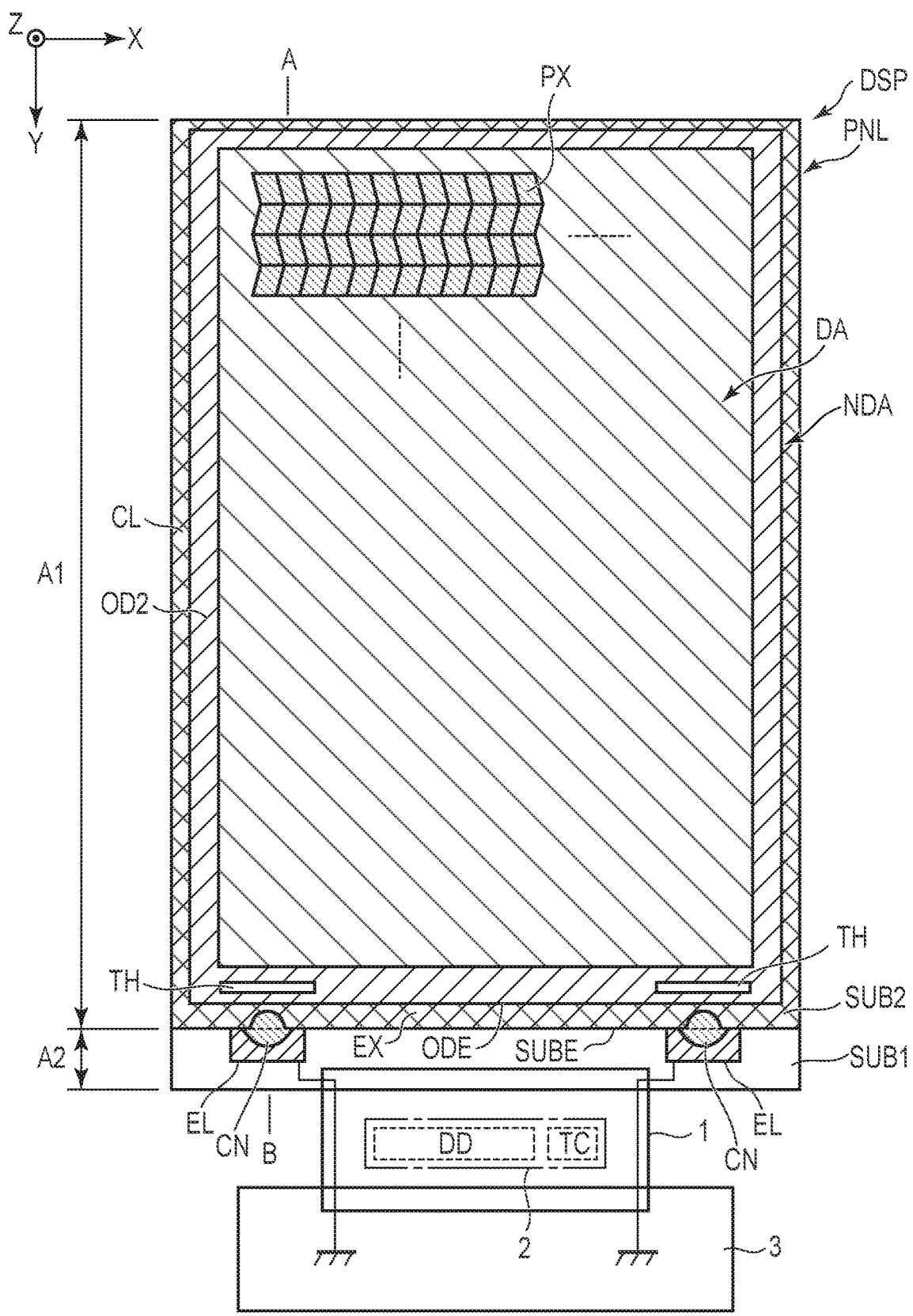
FIG. 1 is a plan view showing the appearance of a display device DSP.

In general, according to one embodiment, a display device including: a first substrate; a second substrate including a transparent conductive film; an optical element adhered to the transparent conductive film; and a connecting member, wherein the first substrate includes a first region in which the second substrate overlaps and a second region including an electrode, the second substrate includes a substrate edge located at a boundary between the first region and the second region, the transparent conductive film includes an extended portion extending from the optical element toward the substrate edge, the connecting member is in contact with the substrate edge and electrically connects the electrode and the extended portion, the optical element includes a penetration portion, and the penetration portion and the connecting member are arranged in a direction intersecting an extending direction of the substrate edge.

According to another embodiment, a display device including: a first substrate; a second substrate including a transparent conductive film; an optical element adhered to the transparent conductive film; and a connecting member, wherein the first substrate includes a first region in which the second substrate overlaps and a second region including an electrode, the second substrate includes a substrate edge located at a boundary between the first region and the second region, the transparent conductive film includes an extended portion extending from the optical element toward the substrate edge, the connecting member is in contact with the substrate edge and electrically connects the electrode and the extended portion, the optical element includes a notch, and the notch and the connecting member are arranged in a direction intersecting an extending direction of the substrate edge.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference sings, and detailed descriptions of them that are considered redundant are omitted unless otherwise necessary.

First Embodiment

FIG. 1 is a plan view showing the appearance of a display device DSP. In one example, a first direction X, a second direction Y, and a third direction Z are orthogonal to each other, but may intersect at an angle other than 90 degrees. The first direction X and the second direction Y correspond to the directions parallel to the main surface of the substrate constituting a display device DSP, and the third direction Z corresponds to the thickness direction of the display device DSP. For example, the first direction X corresponds to the short side direction of the display device DSP, and the second direction Y corresponds to the long side direction of the display device DSP. In the present specification, it is assumed that there is an observation position for observing the display device DSP on the tip side of the arrow indicating the third direction Z, and viewing from this observation position toward the XY-plane defined by the first direction X and the second direction Y is referred to planar view.

The display device DSP includes a display panel PNL, a flexible printed circuit board 1, an IC chip 2, and a circuit board 3.

The display panel PNL is a liquid crystal display panel, and includes a first substrate SUB1, a second substrate SUB2, and a liquid crystal layer LC to be described later. The display panel PNL includes a display portion DA configured to display an image and a frame-shaped non-display portion NDA that surrounds the display portion DA. The first substrate SUB1 includes a first region A1 and a second region A2 arranged in the second direction Y. The second substrate SUB2 has a substrate edge SUBE located at the boundary between the first region A1 and the second region A2. The second substrate SUB2 overlaps the first substrate SUB1 in the first region A1 and does not overlap the first substrate SUB1 in the second region A2. The substrate edge SUBE extends along the first direction X. The display portion DA is included in the first region A1.

The display portion DA includes a plurality of pixels PX arrayed in a matrix in the first direction X and the second direction Y. The pixel PX here indicates a minimum unit that can be individually controlled according to a pixel signal and may be referred to as a sub-pixel. The pixel PX is, for example, any of a red pixel that displays red, a green pixel that displays green, a blue pixel that displays blue, and a white pixel that displays white.

The flexible printed circuit board 1 is mounted in the second region A2 and is electrically connected to the circuit board 3. The IC chip 2 is mounted on the flexible printed circuit board 1. The IC chip 2 may be mounted in the second region A2. The IC chip 2 has a built-in display driver DD. The display driver DD outputs a signal required for image display in an image display mode for displaying an image. In the example shown in FIG. 1, the IC chip 2 has a built-in touch controller TC. The touch controller TC controls a touch sensing mode that detects the approach or contact of an object to/with the display device DSP.

The first substrate SUB1 includes an electrode EL in the second region A2. The electrode EL is grounded via, for example, the flexible printed circuit board 1, but may be set to a predetermined fixed potential. In the example shown in FIG. 1, the electrode EL is provided at two places sandwiching the flexible printed circuit board 1, but it may be provided at only one place or at three or more places.

The second substrate SUB2 includes a transparent conductive film CL. The transparent conductive film CL is formed over almost the entire surface of the second substrate SUB2 and overlaps the display portion DA. The transparent conductive film CL is formed of a transparent conductive material such as indium tin oxide (ITO) or indium zinc oxide (IZO).

The optical element OD2 (the optical sheet) overlaps the transparent conductive film CL. The optical element OD2 overlaps the display portion DA and extends to the non-display portion NDA. The optical element OD2 includes an edge ODE located between the display portion DA and the substrate edge SUBE. The edge ODE is formed in a linear shape along the first direction X. Further, the optical element OD2 includes a penetration portion TH located in the non-display portion NDA. The penetration portion TH is located between the substrate edge SUBE and the display portion DA. The transparent conductive film CL includes an extended portion EX that extends toward the substrate edge SUBE from the edge ODE of the optical element OD2.

A connecting member CN is located in the non-display portion NDA, and electrically connects the electrode EL and the extended portion EX of the transparent conductive film CL via the substrate edge SUBE. The connecting member CN is formed of, for example, a conductive resin material. The penetration portion TH and the connecting member CN are arranged in a direction intersecting the extending direction of the substrate edge SUBE. In the example shown in FIG. 1, the extending direction of the substrate edge SUBE is parallel to the first direction X. The penetration portion TH and the connecting member CN are arranged along the second direction Y. The penetration portion TH and the connecting member CN may be arranged in an oblique direction angled with respect to the second direction Y. The edge ODE of the optical element OD2 extends between the penetration portion TH and the connecting member CN. In other words, a part of the optical element OD2 is provided between the penetration portion TH and the connecting member CN.

The substrate edge SUBE of the second substrate SUB2 is formed in a linear shape along the first direction X between the penetration portion TH and the electrode EL in a planar view and is also formed in a linear shape along the first direction X between the connecting members CN provided at two places. The substrate edge SUBE of the second substrate SUB2 has neither a concavity recessed in the second direction Y nor a convex portion protruding in the second direction Y. In addition, the second substrate SUB2 does not have a through hole penetrating in the third direction Z.

Figure 2:
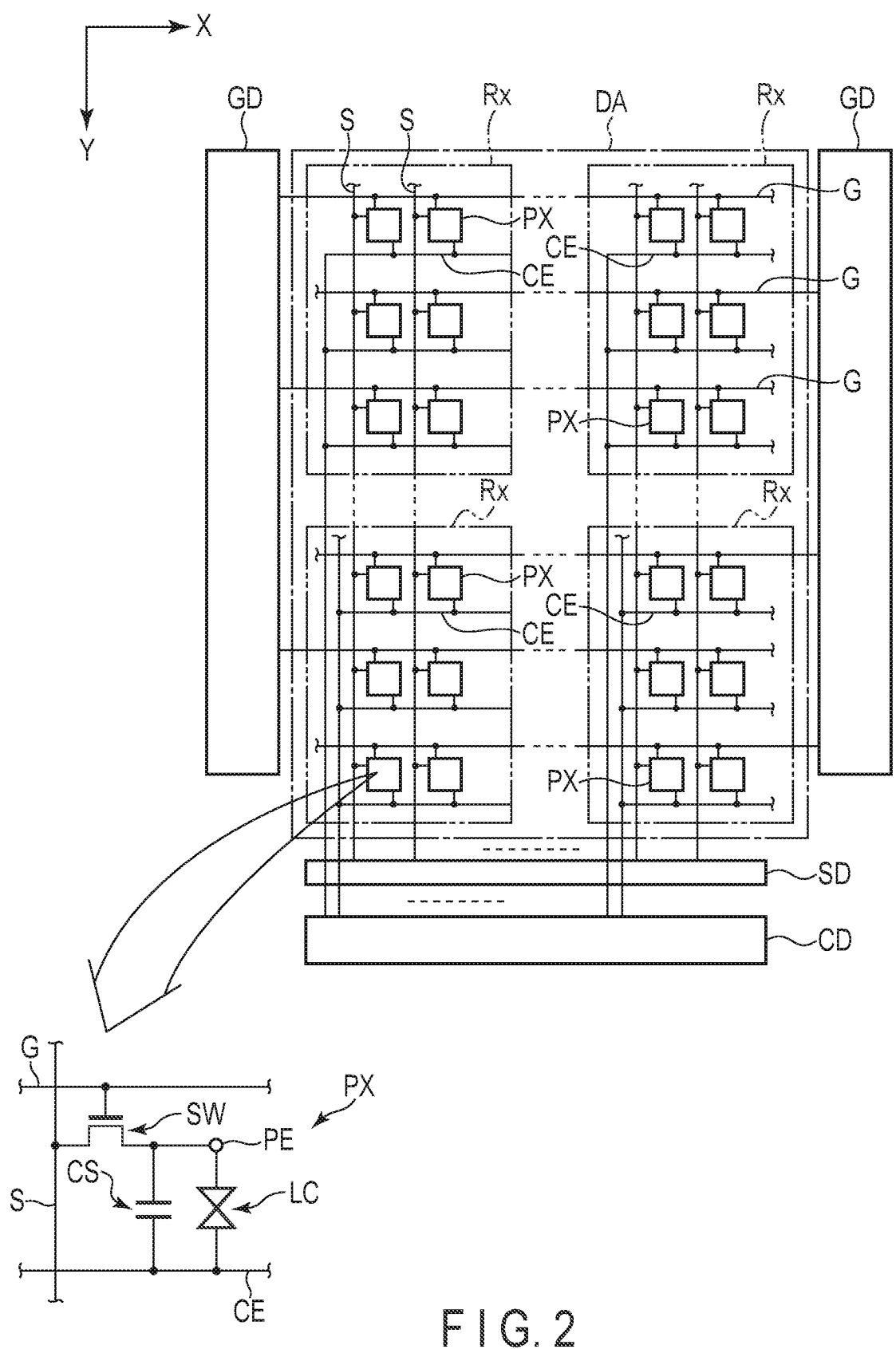
FIG. 2 is a view showing a basic configuration and an equivalent circuit of a pixel PX.

FIG. 2 is a view showing a basic configuration and an equivalent circuit of a pixel PX. A plurality of scanning lines G extend along the first direction X and are electrically connected to a scanning line drive circuit GD. A plurality of signal lines S extend along the second direction Y and are electrically connected to a signal line drive circuit SD. The scanning line G and the signal line S do not necessarily have to extend linearly, and a part of them may be bent. For example, it is assumed that the signal line S extends in the second direction Y even if a part of the signal line S is bent.

A common electrode CE is disposed over a plurality of pixels PX. The common electrode CE is electrically connected to a voltage supply unit CD and the touch controller TC shown in FIG. 1. In the image display mode, the voltage supply unit CD supplies a common voltage (Vcom) to the common electrode CE. In the touch sensing mode, the touch controller TC supplies a touch drive voltage different from the common voltage to the common electrode CE and reads a touch signal from the common electrode CE. Such common electrodes CE are arrayed in a matrix in the first direction X and the second direction Y in the display portion DA, and each function as a detection electrode Rx.

Each pixel PX includes a switching element SW, a pixel electrode PE, a common electrode CE, a liquid crystal layer LC, and the like. The switching element SW is composed of, for example, a thin-film transistor (TFT) and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each of the pixel electrodes PE is opposed to the common electrode CE, and the liquid crystal layer LC is driven by the electric field generated between the pixel electrode PE and the common electrode CE. A capacitance CS is formed, for example, between an electrode having the same electric potential as the common electrode CE and an electrode having the same electric potential as the pixel electrode PE.

Figure 3:
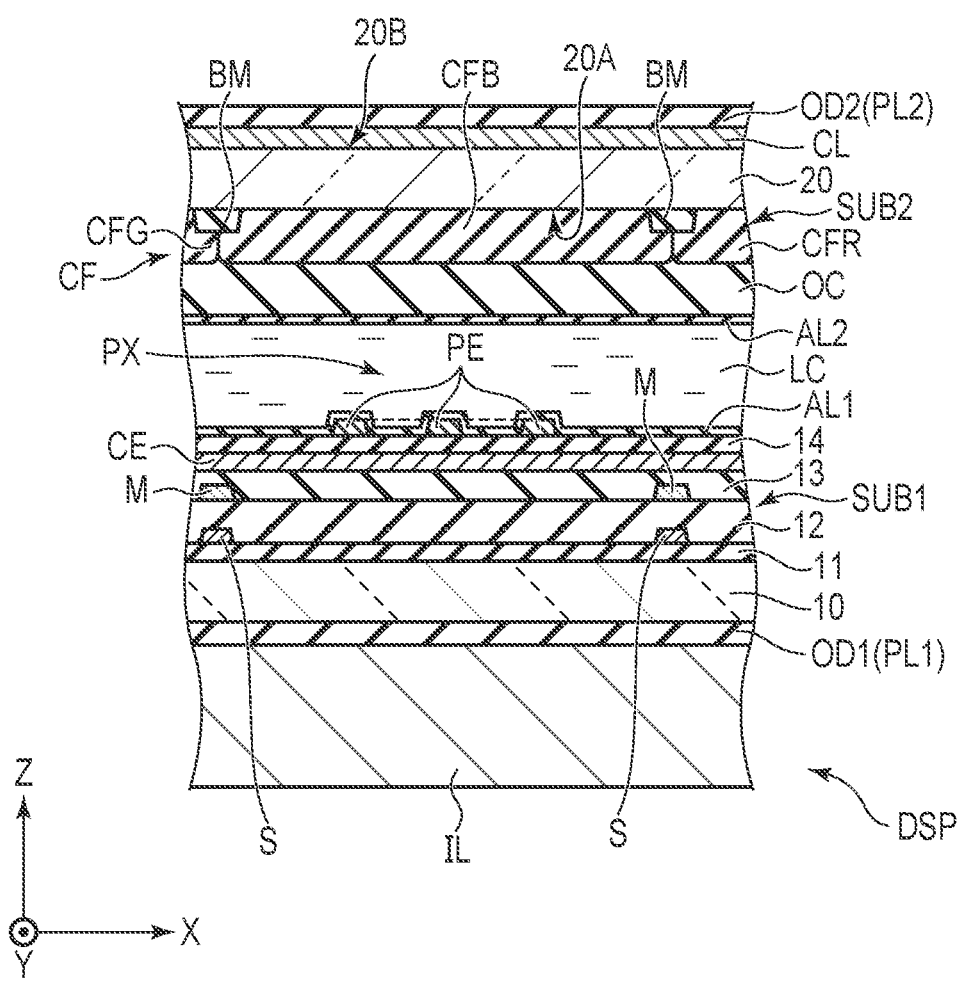
FIG. 3 is a cross-sectional view of the display device DSP including the pixel PX shown in FIG. 2.

FIG. 3 is a cross-sectional view of the display device DSP including the pixel PX shown in FIG. 2. Here, an example in which a lateral electric field method is applied will be described. In the present specification, the direction from the first substrate SUB1 toward the second substrate SUB2 is referred to as "upper side" (or simply as above), and the direction from the second substrate SUB2 toward the first substrate SUB1 is "lower side" (or simply as below). In the case of "the second member above the first member" and "the second member below the first member", the second member may be in contact with the first member or may be spaced apart from the first member.

The first substrate SUB1 includes an insulating substrate 10, insulating films 11 to 14, the signal line S, a metal line M, the common electrode CE, the pixel electrode PE, an alignment film AL1, and the like. The second substrate SUB2 includes an insulating substrate 20, a light-shielding layer BM, a color filter layer CF, an overcoat layer OC, an alignment film AL2, a transparent conductive film CL, and the like. The insulating substrates 10 and 20 are transparent substrates such as a glass substrate and a flexible resin substrate.

In the first substrate SUB1, the signal line S is located on the insulating film 11 and is covered with the insulating film 12. The metal line M is located on the insulating film 12 and is covered with the insulating film 13. The common electrode CE is located on the insulating film 13 and is covered with the insulating film 14. The pixel electrode PE is located on the insulating film 14 and is covered with the alignment film AL1. It should be noted that another inorganic insulating film, a semiconductor layer of the switching element SW shown in FIG. 2, the scanning line G, and the like are disposed between the insulating substrate 10 and the insulating film 11. The metal line M is located directly above the signal line S and is electrically connected to the common electrode CE. In addition, the metal line M forms a conductive path that electrically connects the voltage supply unit CD and the common electrode CE in the image display mode described with reference to FIG. 2, and forms a conductive path that electrically connects the touch controller TC and the common electrode CE in the touch sensing mode.

The insulating films 11 and 14 are inorganic insulating films formed of silicon oxide, silicon nitride, silicon oxynitride, and the like. The insulating films 12 and 13 are, for example, organic insulating films formed of an acrylic resin and the like. The insulating film 13 may be an inorganic insulating film. Alternatively, the insulating film 13 may be omitted, and the metal line M and the common electrode CE may be in contact with each other. The pixel electrode PE and the common electrode CE are formed of a transparent conductive material such as ITO or IZO.

In the second substrate SUB2, the light-shielding layer BM and the color filter layer CF are located on an inner surface 20A of the insulating substrate 20. The color filter layer CF includes a red color filter CFR, a green color filter CFG, and a blue color filter CFB. The overcoat layer OC covers the color filter layer CF. The overcoat layer OC is a transparent organic insulating film. The alignment film AL2 covers the overcoat layer OC. The transparent conductive film CL is located on an outer surface 20B of the insulating substrate 20.

The liquid crystal layer LC is located between the first substrate SUB1 and the second substrate SUB2, and is held between the alignment film AL1 and the alignment film AL2.

An optical element OD1 including a polarizer PL1 is adhered to the insulating substrate 10. An optical element OD2 including a polarizer PL2 is adhered to the transparent conductive film CL. The optical elements OD1 and OD2 may include a retardation film, a scattering layer, an anti-reflective layer, and the like, as needed. An illumination device IL irradiates an illumination light toward the display panel PNL.

FIG. 4 is a cross-sectional view of the display panel PNL along A-B shown in FIG. 1. It should be noted that, here, only the configuration necessary for explanation is shown, the first substrate SUB1 is shown in a simplified manner, and the optical element OD1 and the illumination device IL are omitted.

In the second substrate SUB2, a light-shielding layer LS is provided on the inner surface 20A of the insulating substrate 20 and is located on the non-display portion NDA. The light-shielding layer LS is disposed so as to surround the display portion DA. The boundary between the display portion DA and the non-display portion NDA is defined by an inner peripheral portion LSI of the light-shielding layer LS. Such light-shielding layer LS is integrally formed with the light-shielding layer BM shown in FIG. 3.

A sealant SE is located in the non-display portion NDA, adheres the first substrate SUB1 and the second substrate SUB2, and seals the liquid crystal layer LC. The sealant SE is provided at a position overlapping with the light-shielding layer LS.

The transparent conductive film CL is provided on the outer surface 20B of the insulating substrate 20, and is provided over the display portion DA and the non-display portion NDA. The optical element OD2 is adhered to the transparent conductive film CL by an adhesive layer AD. The penetration portion TH of the optical element OD2 overlaps the light-shielding layer LS in the non-display portion NDA.

The connecting member CN overlaps the light-shielding layer LS on the second substrate SUB2 and is in contact with the extended portion EX of the transparent conductive film CL. The connecting member CN is in contact with the electrode EL in the second region A2 of the first substrate SUB1. The connecting member CN is in contact with the substrate edge SUBE of the second substrate SUB2, and is continuously provided between the transparent conductive film CL and the electrode EL. As a result, the transparent conductive film CL and the electrode EL are electrically connected via the connecting member CN.

In the example shown in FIG. 4, the edge ODE of the optical element OD2 is spaced apart from the connecting member CN along the second direction Y. The edge ODE may be in contact with the connecting member CN, but in order to make the connecting member CN less susceptible to the expansion of the optical element OD2, the edge ODE is desirably spaced apart from the connecting member CN.

Figure 5:
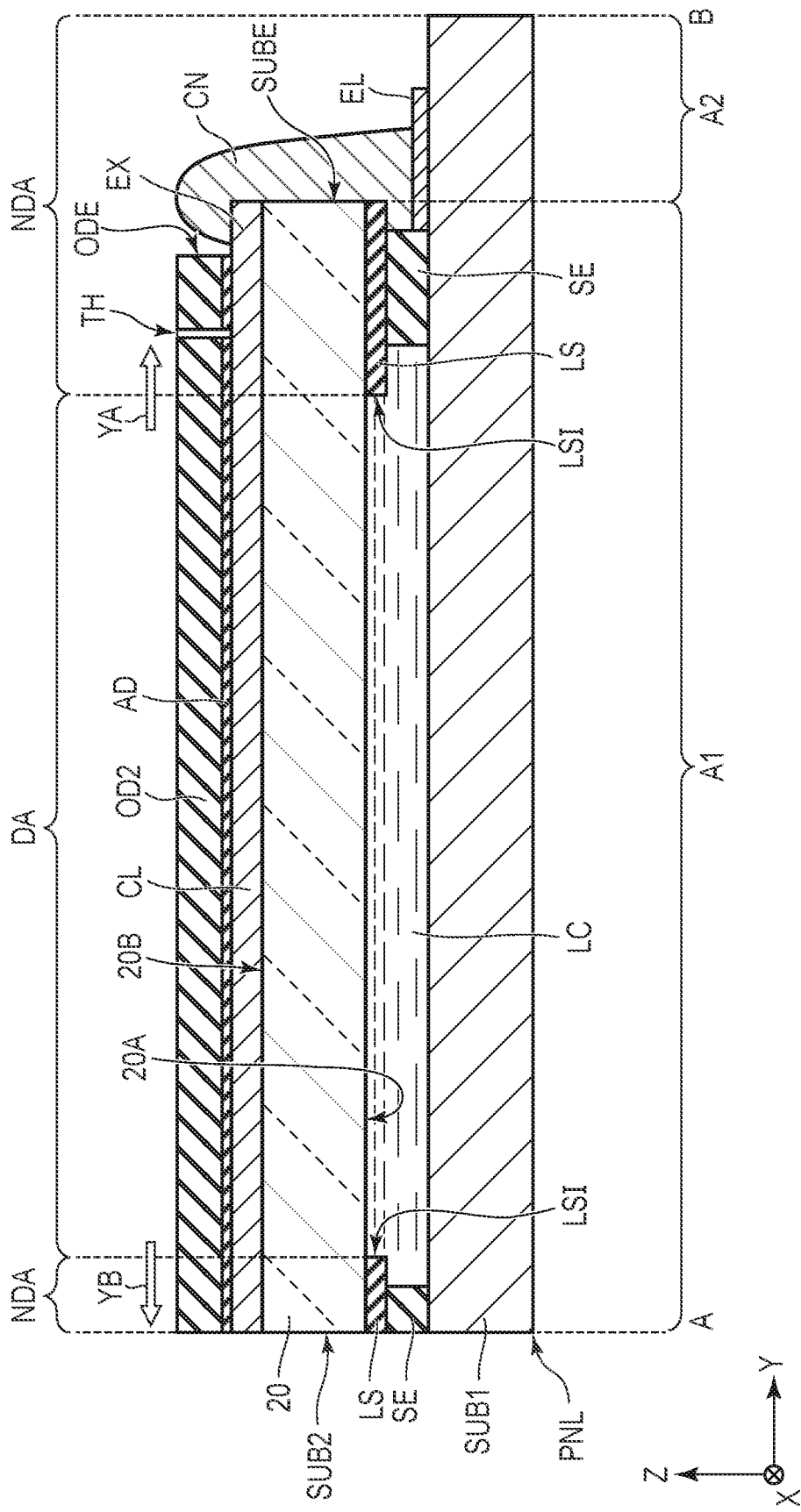
FIG. 5 is another cross-sectional view of the display panel PNL along A-B shown in FIG. 1.

FIG. 5 is another cross-sectional view of the display panel PNL along A-B shown in FIG. 1. Here, the optical element OD2 shown in FIG. 4 is shown in an expanded state along the second direction Y.

As shown by arrows YA and YB in FIG. 5, when the optical element OD2 expands along the second direction Y, the penetration portion TH shrinks according to the expansion, particularly on the side close to the connecting member CN. In this way, the penetration portion TH functions as a buffer that absorbs the expansion of the optical element OD2. Alternatively, the penetration portion TH functions as a discontinuous portion that makes it less susceptible to the expansion of the optical element OD2 main body.

For this reason, even if the optical element OD2 expands, the position of the edge ODE hardly changes. In other words, the movement of the edge ODE in the direction close to the connecting member CN is suppressed. As a result, it is possible to prevent the connecting member CN from being pushed out by the optical element OD2 along the second direction Y. In addition, it is possible to suppress a connection failure due to a reduction in the contact area between the connecting member CN and the transparent conductive film CL. Therefore, it is possible to suppress degradation in reliability.

In addition, it is possible to form a discharge path from the transparent conductive film CL to the electrode EL at ground potential via the connecting member CN, and to suppress the charging of the second substrate SUB2. As a result, degradation in display quality due to charging can be suppressed.

First Configuration Example of Penetration Portion

Figure 6:
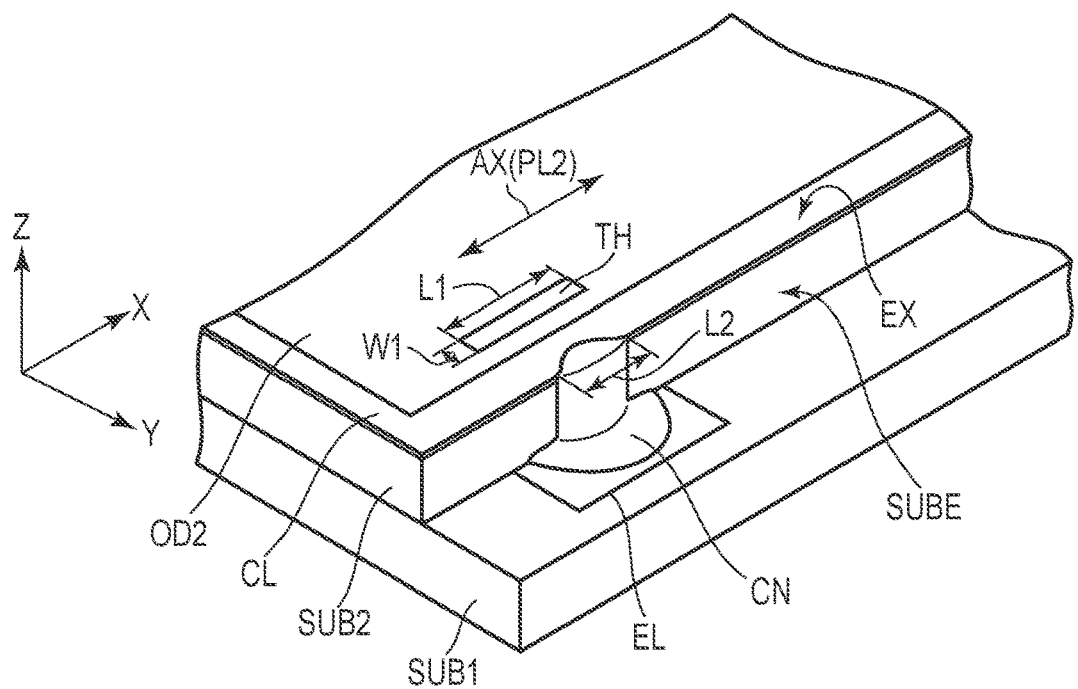
FIG. 6 is a perspective view showing a first configuration example of a penetration portion TH.

FIG. 6 is a perspective view showing a first configuration example of the penetration portion TH.

In the first configuration example shown in FIG. 6, the penetration portion TH is a slit extending along the first direction X parallel to the substrate edge SUBE. The penetration portion TH has a length L1 along the first direction X and a width W1 along the second direction Y. The connecting member CN has a length L2 along the first direction X at a position overlapping with the extended portion EX of the transparent conductive film CL. The length L1 is longer than the length L2. For example, the length L1 is 1.5 times or more larger than the length L2.

The optical element OD2 includes an extension film such as the polarizer PL2 as described with reference to FIG. 3. The extension film has a direction in which it easily expands and contracts when it is affected by heat and a direction in which it does not easily expand and contract. For example, in the polarizer PL2, the direction parallel to a polarization axis (or absorption axis) AX is likely to expand and contract when affected by heat, and the direction orthogonal to the polarization axis AX is difficult to expand and contract. In the example shown in FIG. 6, the polarization axis AX is substantially parallel to the first direction X.

In the first embodiment, the penetration portion TH and the connecting member CN are arranged in a direction intersecting the polarization axis AX (or in a direction orthogonal to the polarization axis AX). In other words, the penetration portion TH and the connecting member CN are arranged in a direction in which the optical element OD2 is difficult to expand and contract. For this reason, even when the optical element OD2 expands, it is possible to prevent the optical element OD2 from pushing out the connecting member CN. In addition, with the demand for narrowing the frame of the display device DSP, even when the optical element OD2 is disposed close to the connecting member CN, the optical element OD2 includes the penetration portion TH arranged in the connecting member CN, and therefore, the edge ODE between the penetration portion TH and the connecting member CN is suppressed from moving toward the connecting member CN. Therefore, as described above, a connection failure between the connecting member CN and the transparent conductive film CL can be suppressed.

Second Configuration Example of Penetration Portion

Figure 7:
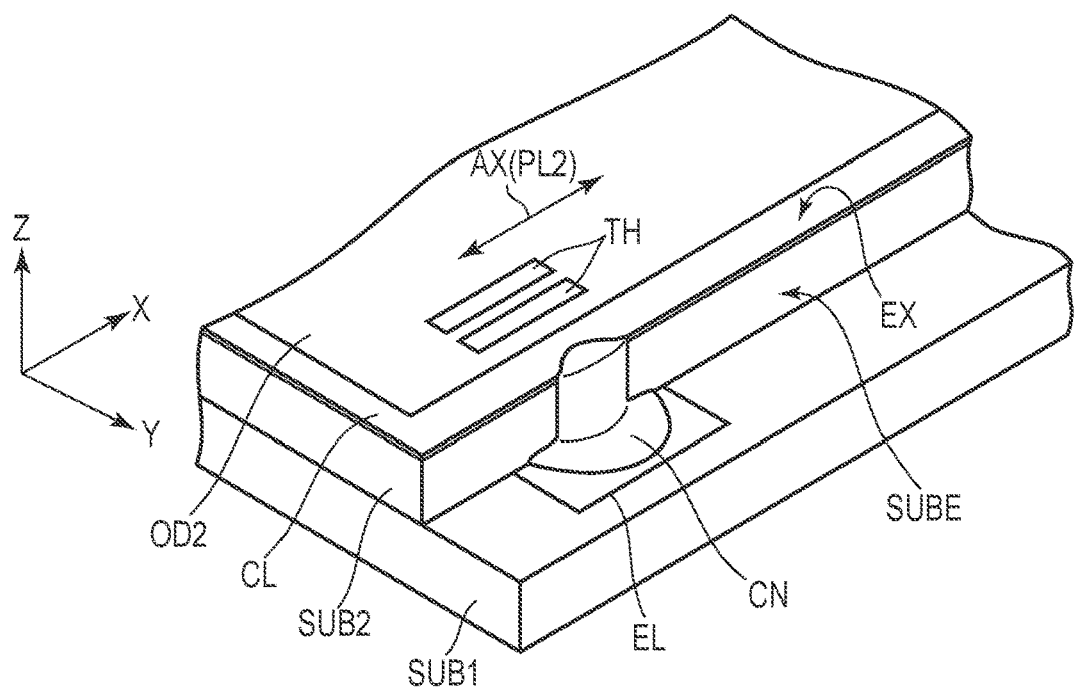
FIG. 7 is a perspective view showing a second configuration example of the applicable penetration portion TH.

FIG. 7 is a perspective view showing a second configuration example of the applicable penetration portion TH.

The second configuration example shown in FIG. 7 is different from the first configuration example shown in FIG. 6 in that a plurality of penetration portions TH are formed. That is, each of the plurality of penetration portions TH is a slit, extends along the first direction X, and is arranged at an interval in the second direction Y. Here, two penetration portions TH are arranged, but the number of penetration portions TH is not limited to the illustrated example, and three or more penetration portions TH may be arranged. Even in this second configuration example, the same effect as described in the first configuration example can be obtained.

Third Configuration Example of Penetration Portion

Figure 8:
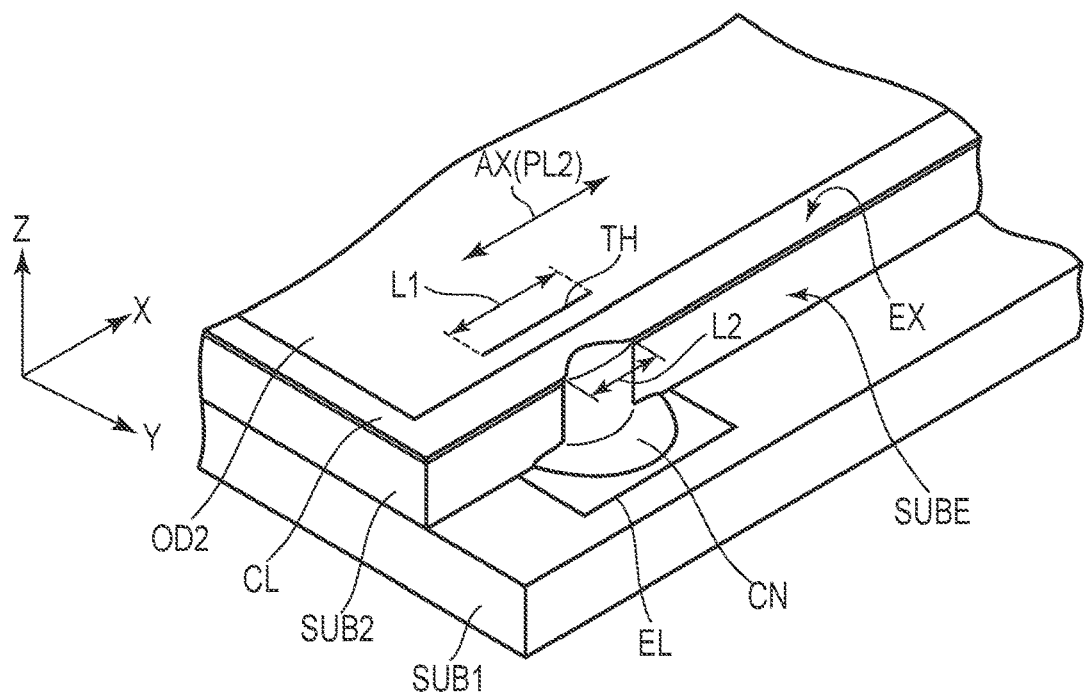
FIG. 8 is a perspective view showing a third configuration example of the applicable penetration portion TH.

FIG. 8 is a perspective view showing a third configuration example of the applicable penetration portion TH.

The third configuration example shown in FIG. 8 is different from the first configuration example shown in FIG. 6 in that the penetration portion TH is a cut line extending along the first direction X. That is, the penetration portion TH has the length L1 along the first direction X, while the width along the second direction Y is almost zero. Even in this third configuration example, the penetration portion TH functions as a discontinuous portion that makes it less susceptible to the expansion of the optical element OD2 main body. For this reason, the same effect as described in the first configuration example can be obtained.

Fourth Configuration Example of Penetration Portion

Figure 9:
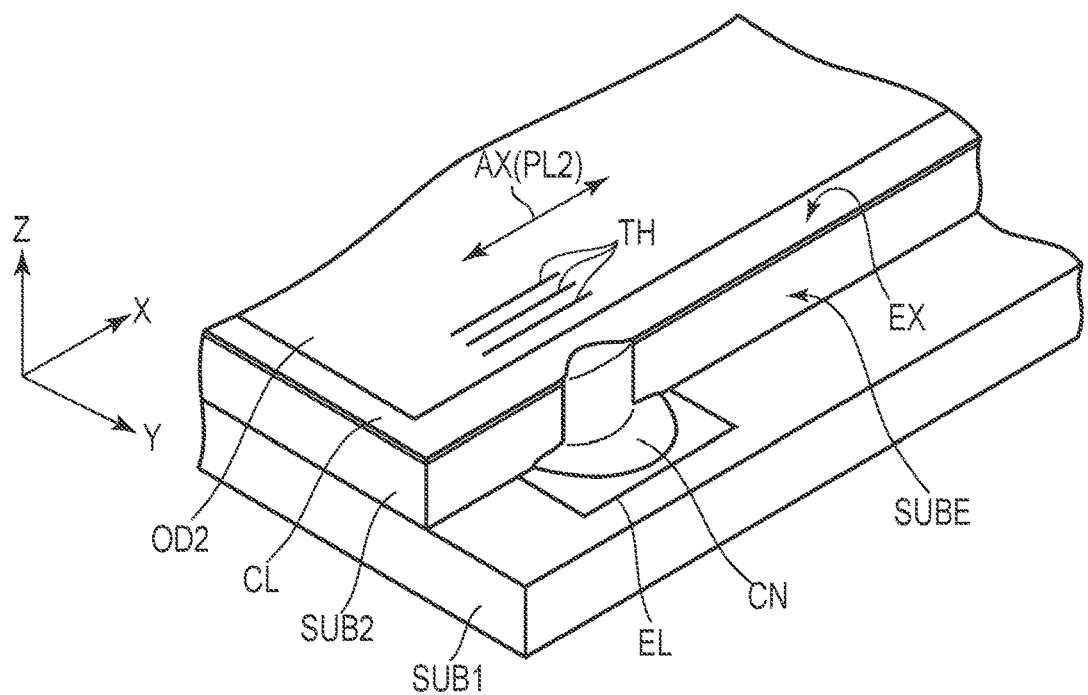
FIG. 9 is a perspective view showing a fourth configuration example of the applicable penetration portion TH.

FIG. 9 is a perspective view showing a fourth configuration example of the applicable penetration portion TH.

The fourth configuration example shown in FIG. 9 is different from the third configuration example shown in FIG. 8 in that a plurality of penetration portions TH are formed. That is, each of the plurality of penetration portions TH is a cut line, extends along the first direction X, and is arranged at an interval in the second direction Y. Here, three penetration portions TH are arranged, but the number of penetration portions TH is not limited to the illustrated example, and four or more penetration portions TH may be arranged. Even in this fourth configuration example, the same effect as described in the first configuration example can be obtained.

Fifth Configuration Example of Penetration Portion

Figure 10:
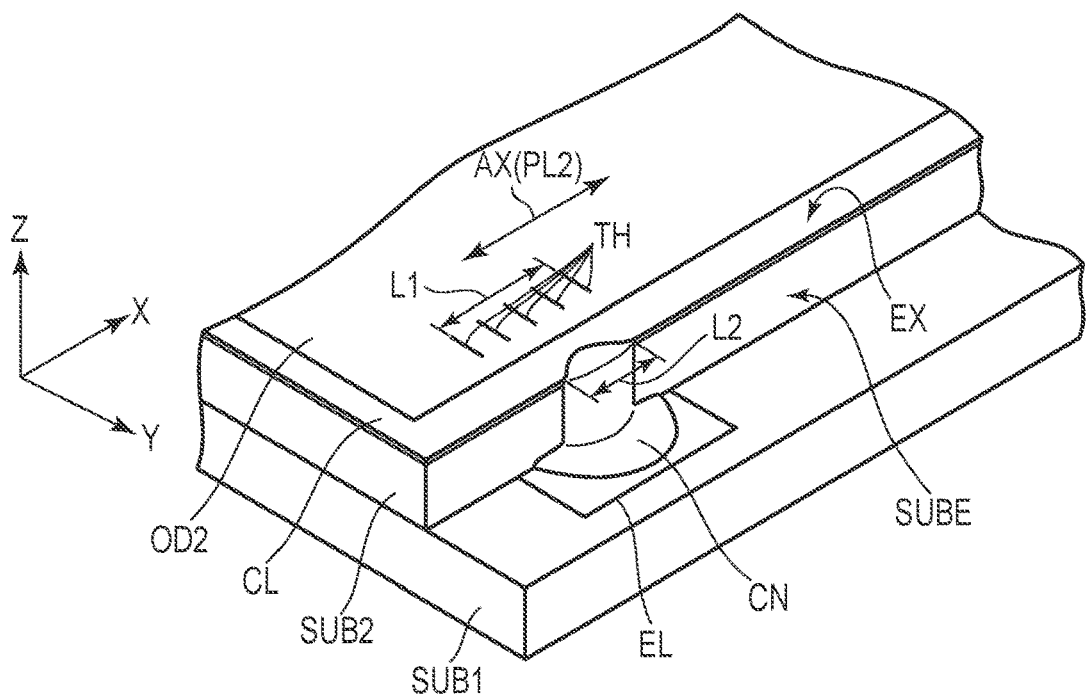
FIG. 10 is a perspective view showing a fifth configuration example of the applicable penetration portion TH.

FIG. 10 is a perspective view showing a fifth configuration example of the applicable penetration portion TH.

The fifth configuration example shown in FIG. 10 is different from the third configuration example shown in FIG. 8 in that each of the plurality of penetration portions TH is a cut line extending along the second direction Y. The plurality of penetration portions TH are arranged at intervals in the first direction X within a range of the length L1 along the first direction X. Even in this fifth configuration example, the same effect as described in the first configuration example can be obtained.

Sixth Configuration Example of Penetration Portion

Figure 11:
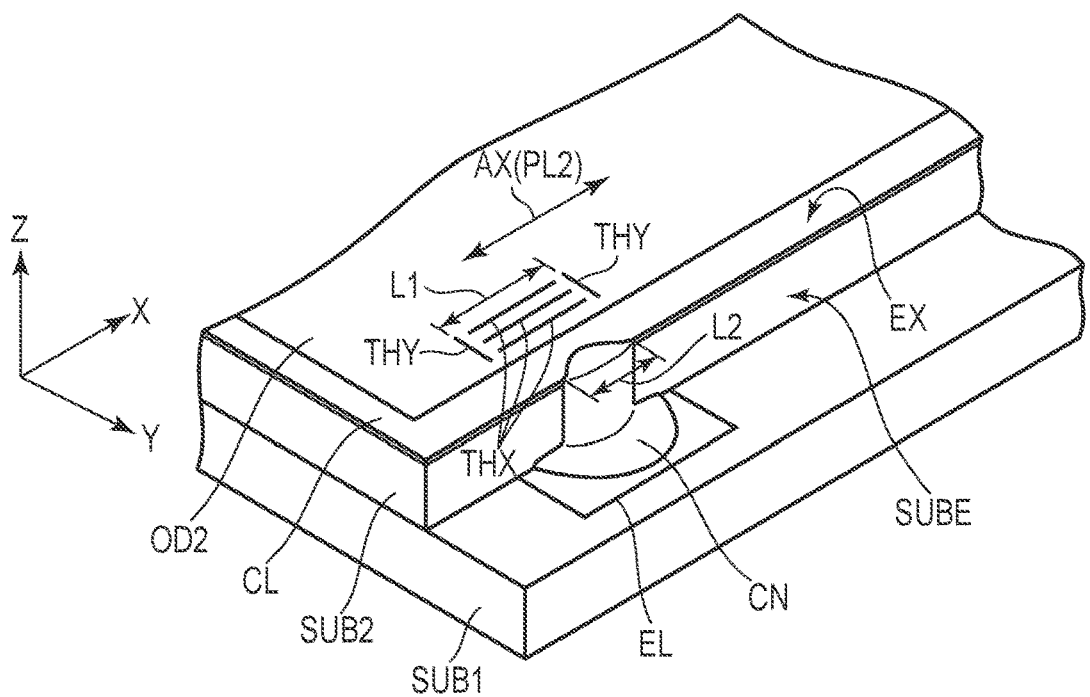
FIG. 11 is a perspective view showing a sixth configuration example of the applicable penetration portion TH.

FIG. 11 is a perspective view showing a sixth configuration example of the applicable penetration portion TH.

The sixth configuration example shown in FIG. 11 is different from the fifth configuration example shown in FIG. 10 in that a plurality of penetration portions TH extending along the different directions are formed. In the sixth configuration example, a plurality of penetration portions THX extending along the first direction X and a plurality of penetration portions THY extending along the second direction Y are formed. The plurality of penetration portions THY are arranged at intervals of the length L1 along the first direction X. The plurality of penetration portions THX are located between the plurality of penetration portions THY and are arranged at intervals in the second direction Y. Each of the penetration portions THX is spaced apart from the plurality of penetration portions THY. Even in this sixth configuration example, the same effect as described in the first configuration example can be obtained.

Seventh Configuration Example of Penetration Portion

Figure 12:
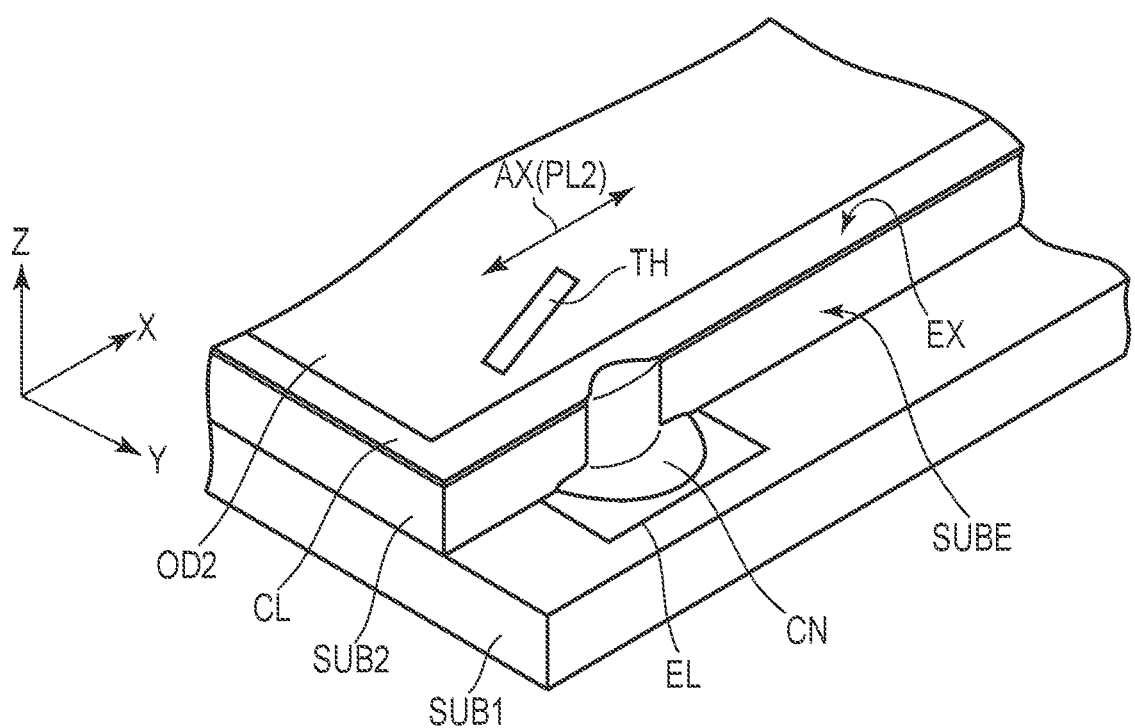
FIG. 12 is a perspective view showing a seventh configuration example of the applicable penetration portion TH.

FIG. 12 is a perspective view showing a seventh configuration example of the applicable penetration portion TH.

The seventh configuration example shown in FIG. 12 is different from the first configuration example shown in FIG. 6 in that the penetration portion TH extends along the direction intersecting the first direction X and the second direction Y. In the seventh configuration example, the penetration portion TH is a slit, but it may be a cut line as described in the third configuration example. Even in this seventh configuration example, the same effect as described in the first configuration example can be obtained.

Second Embodiment

Figure 13:
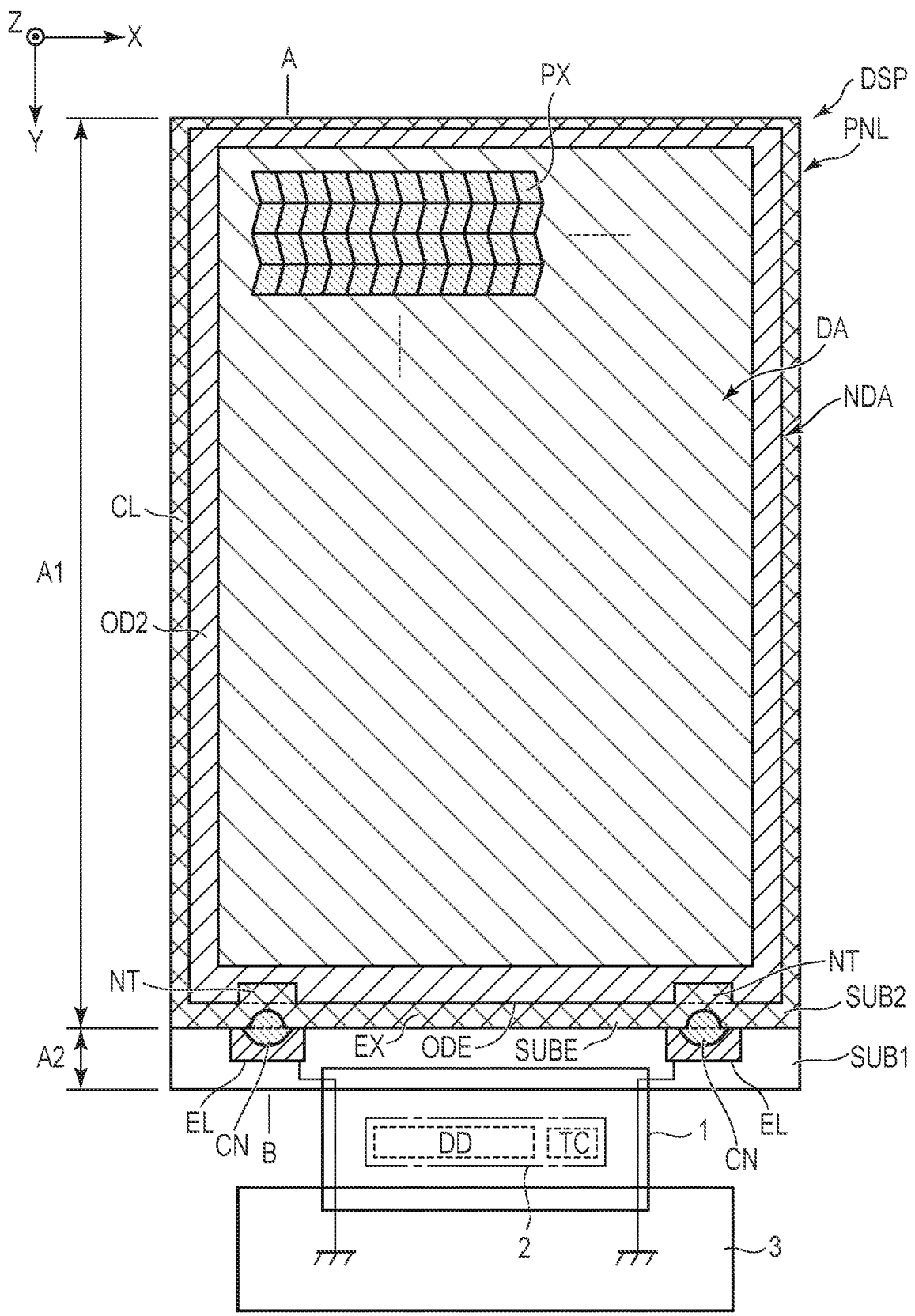
FIG. 13 is a plan view showing the appearance of a display device DSP.

FIG. 13 is a plan view showing the appearance of a display device DSP.

The display device DSP in the second embodiment shown in FIG. 13 is different from the display device DSP in the first embodiment shown in FIG. 1 in that an optical element OD2 includes a notch NT located in a non-display portion NDA. The notch NT corresponds to a concavity recessed along the second direction Y toward a display portion DA, in an edge ODE along the first direction X of the optical element OD2.

The notch NT is located between the display portion DA and a connecting member CN. The notch NT and the connecting member CN are arranged in a direction intersecting the extending direction of a substrate edge SUBE. In the example shown in FIG. 13, the notch NT and the connecting member CN are arranged along the second direction Y.

Figure 14:
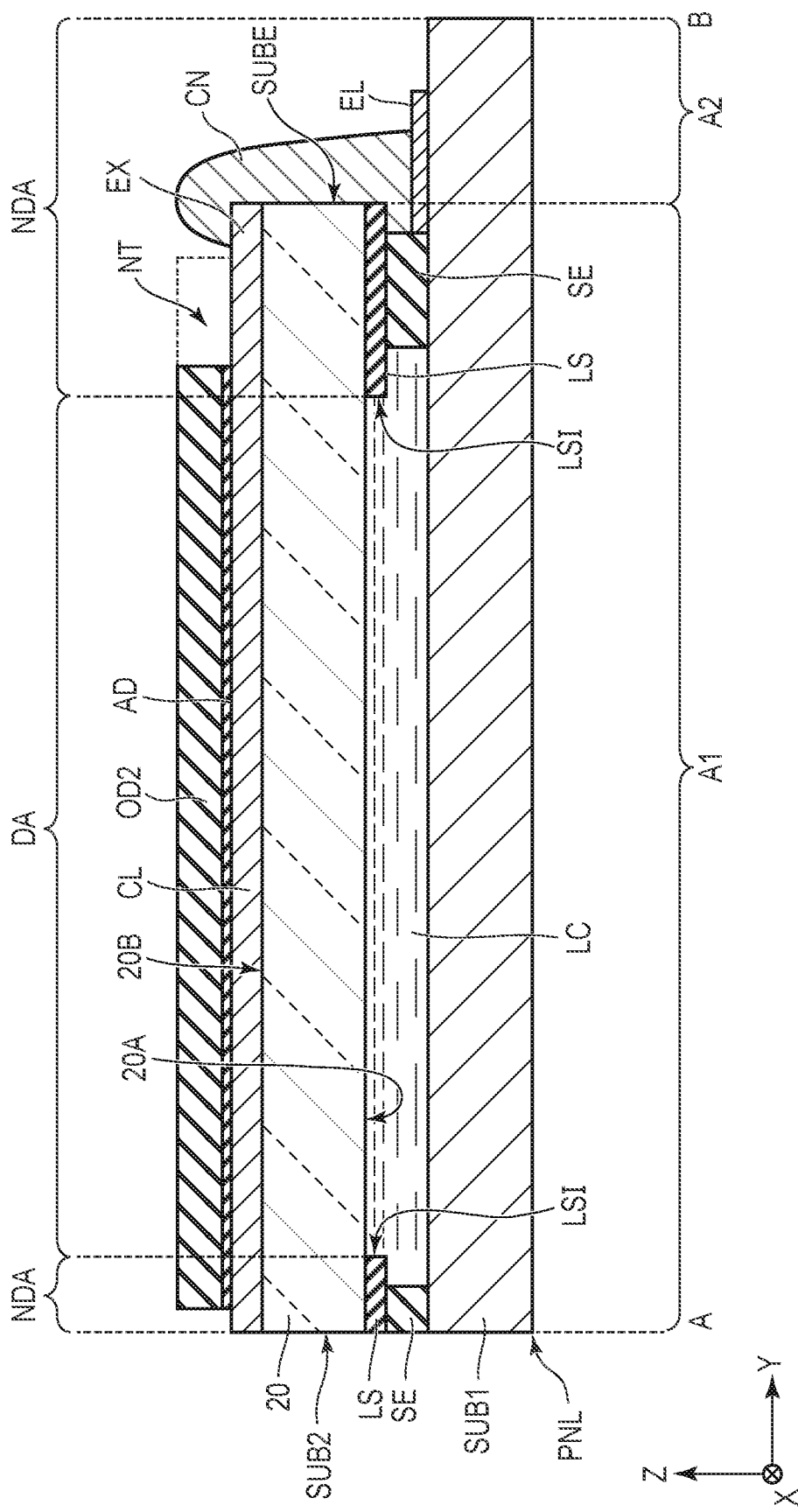
FIG. 14 is a cross-sectional view of a display panel PNL along A-B shown in FIG. 13.

FIG. 14 is a cross-sectional view of a display panel PNL along A-B shown in FIG. 13. It should be noted that, here, only the configuration necessary for explanation is shown, the first substrate SUB1 is shown in a simplified manner, and the optical element OD1 and the illumination device IL are omitted. The notch NT of the optical element OD2 overlaps a light-shielding layer LS in the non-display portion NDA. The optical element OD2 is spaced apart from the connecting member CN.

When the optical element OD2 expands along the second direction Y, the notch NT functions as a buffer that absorbs the expansion of the optical element OD2. For this reason, when the optical element OD2 expands, even if the notch NT approaches the connecting member CN, it is possible to prevent the connecting member CN from being pushed out by the optical element OD2 along the second direction Y.

Figure 15:
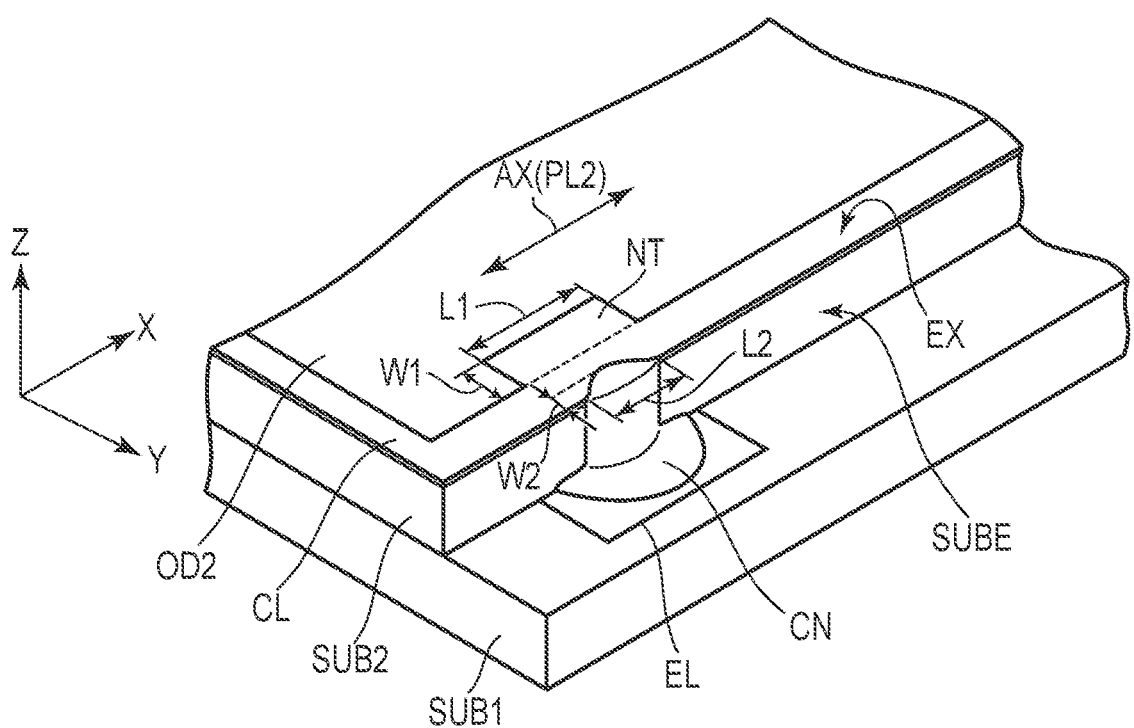
FIG. 15 is a perspective view showing a configuration example of a notch NT.

FIG. 15 is a perspective view showing a configuration example of the notch NT.

The notch NT has a length L1 along the first direction X and a width W1 along the second direction Y. The connecting member CN has a length L2 along the first direction X and a width W2 along the second direction Y at a position overlapping with an extended portion EX of a transparent conductive film CL. The length L1 is longer than the length L2. The width W1 is larger than the width W2.

The optical element OD2 includes a polarizer PL2 having a polarization axis AX. The notch NT and the connecting member CN are arranged in a direction intersecting the polarization axis AX (or in a direction orthogonal to the polarization axis AX). In other words, the notch NT and the connecting member CN are arranged in a direction in which the optical element OD2 is difficult to expand and contract. For this reason, even in the second embodiment, the same effect as that in the above-mentioned first embodiment can be obtained.

As described above, according to the present embodiment, it is possible to provide a display device capable of suppressing degradation in reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configuration disclosed in the present specification is added below.

(1) A display device comprising:
a first substrate;
a second substrate including a transparent conductive film;
an optical element adhered to the transparent conductive film; and
a connecting member, wherein the first substrate includes a first region in which the second substrate overlaps and a second region including an electrode, the second substrate includes a substrate edge located at a boundary between the first region and the second region, the transparent conductive film includes an extended portion extending from the optical element toward the substrate edge, the connecting member is in contact with the substrate edge and electrically connects the electrode and the extended portion, the optical element includes a penetration portion, and the penetration portion and the connecting member are arranged in a direction intersecting an extending direction of the substrate edge.

(2) The display device of (1), wherein the penetration portion is a slit or a cut line.

(3) The display device of (2), wherein the penetration portion extends along the substrate edge.

(4) The display device of (3), wherein a length of the penetration portion along the substrate edge is longer than a length of the connecting member overlapping with the extended portion along the substrate edge.

(5) The display device of (2), wherein the penetration portion extends along a direction intersecting the substrate edge.

(6) The display device of (1), wherein the optical element includes a polarizer having a polarization axis, and the penetration portion and the connecting member are arranged in a direction intersecting the polarization axis.

(7) The display device of (1), wherein the first region includes a display portion configured to display an image, the second substrate includes a light-shielding layer that surrounds the display portion, and the penetration portion overlaps the light-shielding layer.

(8) A display device comprising:

a first substrate;

a second substrate including a transparent conductive film;

an optical element adhered to the transparent conductive film; and a connecting member, wherein the first substrate includes a first region in which the second substrate overlaps and a second region including an electrode, the second substrate includes a substrate edge located at a boundary between the first region and the second region, the transparent conductive film includes an extended portion extending from the optical element toward the substrate edge, the connecting member is in contact with the substrate edge and electrically connects the electrode and the extended portion, the optical element includes a notch, and the notch and the connecting member are arranged in a direction intersecting an extending direction of the substrate edge.

(9) The display device of (8), wherein the optical element includes a polarizer having a polarization axis, and the notch and the connecting member are arranged in a direction intersecting the polarization axis.

(10) The display device of (8), wherein the first region includes a display portion configured to display an image, the second substrate includes a light-shielding layer that surrounds the display portion, and the notch overlaps the light-shielding layer.

(11) A display device including:

a first substrate;

a second substrate including a transparent conductive film;

an optical element adhered to the transparent conductive film; and a connecting member, in which the first substrate includes a first region in which the second substrate overlaps and a second region including an electrode, the second substrate includes a substrate edge located at a boundary between the first region and the second region, the transparent conductive film includes an extended portion extending from the optical element toward the substrate edge, the connecting member is in contact with the substrate edge and electrically connects the electrode and the extended portion, the optical element includes a penetration portion, and the penetration portion is disposed in the vicinity of the connecting member.

What is claimed is:

1. A display device comprising:
   a first substrate;
   a second substrate including a transparent conductive film;
   an optical element adhered to the transparent conductive film; and
   a connecting member, wherein
   the first substrate includes a first region which overlaps the second substrate and includes a display portion, and a second region including an electrode,
   the second substrate includes a substrate edge located at a boundary between the first region and the second region and extending along a first direction,
   the optical element includes an optical element edge located between the display portion and the substrate edge in a second direction intersecting the first direction,
   a whole of the optical element edge does not overlap the substrate edge in a plan view,
   the transparent conductive film includes an extended portion extending from the optical element edge toward the substrate edge,
   the connecting member is in contact with the substrate edge and electrically connects the electrode and the extended portion,
   the optical element includes a notch set back from the optical element edge,
   the notch and the connecting member are arranged in the second direction, and
   a width of the connecting member along the second direction at a position overlapping the extended portion, is less than a width of the extended portion along the second direction.

2. The display device according to claim 1, wherein
   the optical element includes a polarizer having a polarization axis, and
   the notch and the connecting member are arranged in a direction intersecting the polarization axis.

3. The display device according to claim 1, wherein
   the second substrate includes a light-shielding layer that surrounds the display portion, and the notch overlaps the light-shielding layer in the plan view.

* * * * *